United States Patent
Kamijima

(10) Patent No.: US 8,533,509 B2
(45) Date of Patent: Sep. 10, 2013

(54) DEVICE AND METHOD FOR CONTROLLING SECONDARY BATTERY

(75) Inventor: Junya Kamijima, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 337 days.

(21) Appl. No.: 13/014,709

(22) Filed: Jan. 26, 2011

(65) Prior Publication Data

US 2012/0131367 A1    May 24, 2012

(30) Foreign Application Priority Data

Nov. 18, 2010   (JP) ................................. 2010-257802

(51) Int. Cl.
G06F 1/26 (2006.01)
G06F 1/32 (2006.01)
G06F 1/00 (2006.01)

(52) U.S. Cl.
USPC ............................. 713/320; 713/324; 713/340

(58) Field of Classification Search
USPC .................. 713/300, 323–324, 340
See application file for complete search history.

(56) References Cited

U.S. PATENT DOCUMENTS

| | | | | |
|---|---|---|---|---|
| 6,134,457 | A * | 10/2000 | Ha et al. ........................ | 455/572 |
| 2002/0167293 | A1 * | 11/2002 | Ptasinski et al. ............... | 320/132 |
| 2004/0098629 | A1 * | 5/2004 | Khan ............................ | 713/300 |
| 2005/0066208 | A1 * | 3/2005 | Koie et al. ..................... | 713/320 |
| 2005/0242821 | A1 * | 11/2005 | Suzuki et al. ................. | 324/430 |
| 2007/0011040 | A1 * | 1/2007 | Wright et al. .................. | 705/10 |
| 2007/0188146 | A1 * | 8/2007 | Nakano et al. ................ | 320/132 |
| 2008/0007222 | A1 * | 1/2008 | Nance et al. .................. | 320/128 |
| 2008/0111520 | A1 * | 5/2008 | Sasaki ........................... | 320/134 |
| 2009/0168678 | A1 * | 7/2009 | Han et al. ...................... | 370/311 |
| 2009/0218989 | A1 * | 9/2009 | Davis ............................ | 320/136 |
| 2010/0052930 | A1 * | 3/2010 | Grigsby et al. ............... | 340/663 |
| 2010/0231431 | A1 * | 9/2010 | Sakamoto et al. ............ | 341/176 |
| 2010/0332880 | A1 * | 12/2010 | Koyama ....................... | 713/323 |

FOREIGN PATENT DOCUMENTS

| | | | |
|---|---|---|---|
| JP | 2004-198196 A | | 7/2004 |
| JP | 2004198196 A | * | 7/2004 |
| JP | 2009-183067 A | | 8/2009 |
| JP | 2010-019757 A | | 1/2010 |

* cited by examiner

Primary Examiner — Thomas J Cleary
(74) Attorney, Agent, or Firm — Judge Patent Associates

(57) ABSTRACT

A secondary battery control device having a sleep mode includes a current detection element for detecting a charging/discharging current value of a battery, a voltage detection element for detecting an open-circuit voltage value of the battery, and a control section for calculating the remaining capacity of the battery based on the detected values. When the control section enters the sleep mode, the control section sets, in a wake timer, based on the remaining battery capacity and the discharging current value at this time, an amount of time required for the remaining battery capacity to reach a predetermined value (about 5%), as an amount of time required for the control section to be restored to a normal mode. When the set amount of time has passed, the control section is restored to the normal mode, and corrects the remaining battery capacity to obtain an accurate remaining battery capacity.

12 Claims, 6 Drawing Sheets

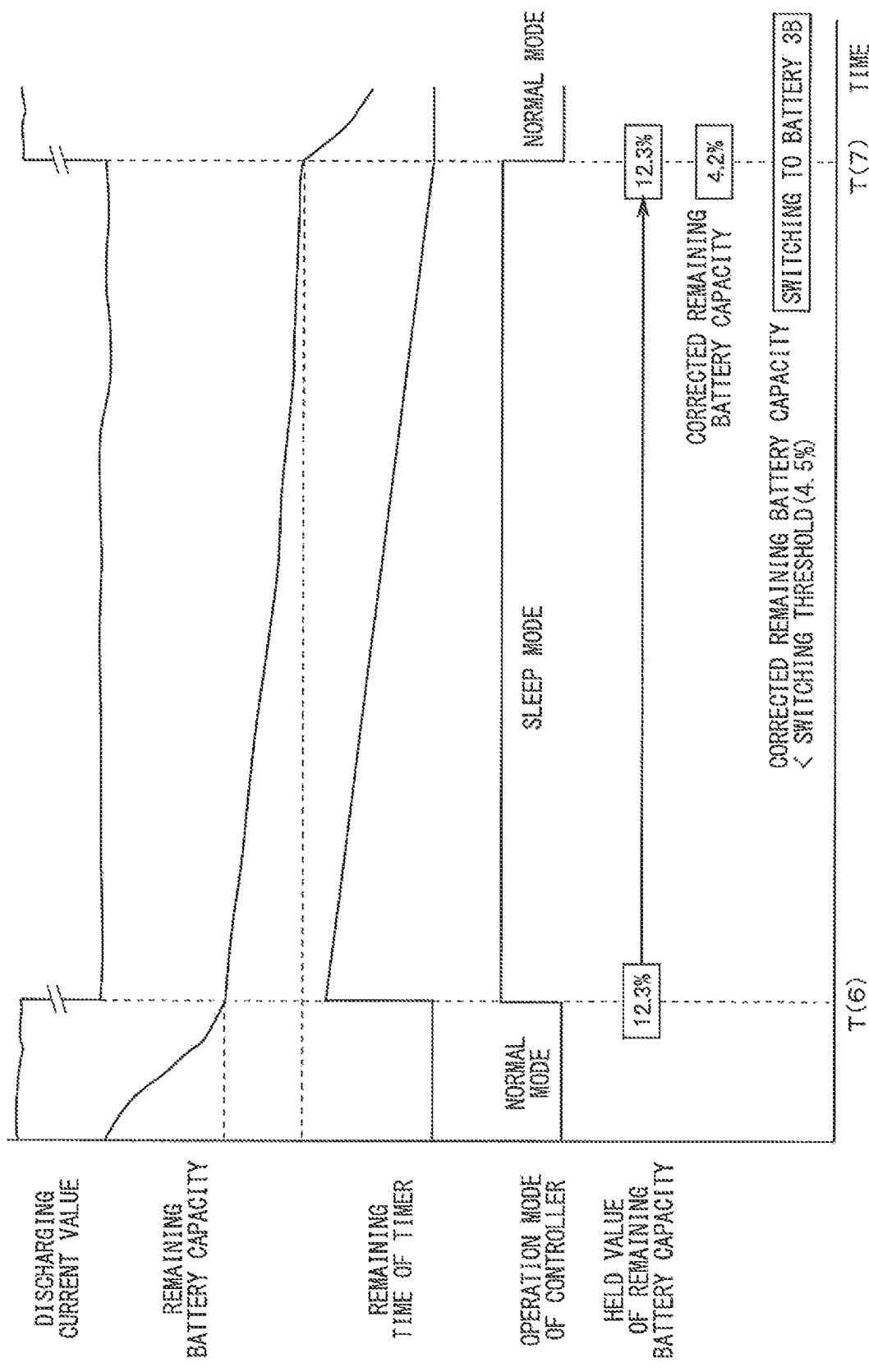

DEVICE AND METHOD FOR CONTROLLING SECONDARY BATTERY

CROSS REFERENCE TO RELATED APPLICATION

The disclosure of Japanese Patent Application No. 2010-257802, filed Nov. 18, 2010, is incorporated herein by reference.

BACKGROUND OF THE INVENTION

1. Field of the Invention

The present invention relates to a device and method for controlling a secondary battery, wherein the device and method are used for an electronic device that uses, as an operation power supply, a secondary battery (sometimes referred to simply as "battery", hereinafter) such as a lithium ion battery, and accurately detect the remaining capacity of the secondary battery when the electronic device enters a power-saving mode (sometimes referred to simply as "sleep mode", hereinafter).

2. Description of the Background Art

Secondary batteries are popular as power supplies for supplying power to portable electronic devices such as mobile phones, digital cameras, and notebook PCs. The capacity of such a secondary battery, which is chargeable by single charging, is limited. In order to continuously use an electronic device having a secondary battery, it is necessary to charge the secondary battery before the remaining capacity thereof becomes zero (in other words, before the secondary battery is fully discharged). Therefore, the user must check the remaining capacity. The remaining capacity is displayed on a screen mounted on the electronic device. If the electronic device is a notebook PC, the performance of the notebook PC may be changed in accordance with the remaining capacity (for example, the brightness of the screen may be reduced), or shutdown may be performed before the remaining capacity becomes zero. In order to perform these processes, it is necessary to accurately calculate the remaining capacity of the secondary battery.

In the electronic devices (such as mobile phones, digital cameras, and notebook PCs) each having a secondary battery as a power supply, an operation mode called a power-saving mode (sleep mode or standby mode) is often utilized for the purpose of reducing power consumption. The power-saving mode is as follows. When an electronic device need not be driven (for example, when a notebook PC is not operated for a predetermined time or more), supply of power to some loads (including various functions and control microcomputers of the notebook PC, particularly, a power supply control microcomputer) is temporarily stopped to minimize power consumption. Thereby, the driving time period of the notebook PC by the secondary battery is maximized.

Even during the power-saving mode, minute current is discharged from the battery. Therefore, it is necessary to accurately calculate the remaining battery capacity even during the power-saving mode. Japanese Laid-Open Patent Publication 2009-183067 (Patent Literature 1) discloses a technique of readily measuring a discharging current value during the power-saving mode to accurately calculate the remaining battery capacity. Japanese Laid-Open Patent Publication No. 2004-198196 (Patent Literature 2) discloses a technique of accurately calculating the remaining battery capacity even when a discharging current value cannot be detected during the power-saving mode. Japanese Laid-Open Patent Publication No. 2010-19757 (Patent Literature 3) discloses a technique of accurately obtaining the remaining battery capacity by restoring the operation mode from the power-saving mode to the normal mode at predetermined time intervals.

However, Patent Literature 1 merely discloses the technique of previously storing the discharging current value in the power-saving mode, and calculating the remaining battery capacity by using the stored current value. In the technique disclosed in Patent Literature 2, since a remaining capacity calculating microcomputer calculates the remaining battery capacity by using the discharging current value (estimated value) also during the power-saving mode, it is necessary to supply power to the remaining capacity calculating microcomputer even during the power-saving mode. In the technique disclosed in Patent Literature 3, since the remaining battery capacity is detected by intermittently performing temporal restoration from the power-saving mode to the normal mode, the period of the power-saving mode is short and thereby the power-saving effect is reduced. Thus, the techniques disclosed in Patent Literatures 1 to 3 cannot accurately calculate the remaining battery capacity while taking advantage of the effect of the power-saving mode.

If the remaining battery capacity cannot be accurately calculated during the power-saving mode, the following problem may occur. In the case of a notebook PC, shutdown is performed before the PC becomes inoperable due to reduction in the remaining battery capacity during the power-saving mode. If this shutdown is performed depending on inaccurate remaining battery capacity, the remaining battery capacity might become 0 (zero) (in other words, the battery might be fully discharged) before the shutdown is normally completed. This situation might cause a serious problem such as data loss.

In the case of a notebook PC having two batteries, the following problem may occur. Such a notebook PC is provided with a switch for selecting either of the two batteries to supply power to loads. The switch is controlled by a power-supply control microcomputer, and the power-supply control microcomputer is not operated during the sleep mode. If the remaining capacity of one of the two batteries is reduced during the power-saving mode, the power-supply control microcomputer controls the switch to select the other battery before the switch becomes inoperable (in other words, the power-supply control microcomputer controls the switch to select the other battery while the power-supply control microcomputer can be driven by the one battery). If this switching is attempted to be performed based on an inaccurate remaining battery capacity, the remaining battery capacity might become 0 (zero) (in other words, the battery might be fully discharged) before the switching. In such case, since power cannot be supplied from the fully-discharged battery to the power-supply control microcomputer, the one battery cannot be switched to the other battery. Although the notebook PC has the two batteries and the other battery has a remaining capacity, battery switching cannot be performed.

SUMMARY OF THE INVENTION

An object of the present invention is to provide a device and method for controlling a secondary battery, where the device and method are used for electronic devices having a power-saving mode, and can accurately detect the remaining capacity of the secondary battery while taking advantage of the effect of the power-saving mode. Another object of the present invention is to provide a device and method for controlling two or more secondary batteries, where the device and method are used for electronic devices each having two or more secondary batteries, and can appropriately perform switching between the secondary batteries during the power-saving mode.

A secondary battery control device according to an aspect of the present invention is used for an electronic device that is driven by power supplied from a secondary battery. The electronic device has a sleep mode in which supply of power to a part of circuitry of the electronic device is temporarily stopped, and a part of functions of the control device is also stopped during the sleep mode. The control device includes: an acquisition section for acquiring a remaining capacity of the secondary battery during a non-sleep mode; a calculation section for calculating, as a restoration time from the sleep mode, a time which is shorter than a full discharge time that is required for the secondary battery to be fully discharged, by using the remaining capacity of the secondary battery, which is acquired during the non-sleep mode immediately before the sleep mode, and using a discharging current value from the secondary battery during the sleep mode; a setting section for setting the restoration time in a wake timer which functions even during the sleep mode; and an instruction section which causes the wake tinier to start when its operation mode is changed from the non-sleep mode to the sleep mode, restores its operation mode from the sleep mode to the non-sleep mode when the restoration time set in the wake tinier is up, and instructs the acquisition section to reacquire the remaining capacity of the secondary battery.

A secondary battery control method according to another aspect of the present invention is used for an electronic device that is driven by power supplied from a secondary battery. The control method includes the steps of: acquiring a remaining capacity of the secondary battery during a non-sleep mode; calculating, as a restoration time from a sleep Mode, a time which is shorter than a full discharge time that is required for the secondary battery to be fully discharged, by using the remaining capacity of the secondary battery, which is acquired during the non-sleep mode immediately before the sleep mode, and using a discharging current value from the secondary battery during the sleep mode; setting the restoration time in a wake tinier which functions even during the sleep mode; and causing the wake timer to start when the operation mode is changed from the non-sleep mode to the sleep mode, restoring the operation mode from the sleep mode to the non-sleep mode when the restoration time set in the wake timer is up, and reacquiring the remaining capacity of the secondary battery.

The secondary battery may be constituted to include a plurality of secondary batteries which are switchable so as to supply power to loads. The control device may be constituted to further include a switch for connecting an output from one of the plurality of secondary batteries to the loads. In this case, the control device further includes a switch control section for controlling the switch so as to connect another secondary battery among the plurality of secondary batteries to the loads, if the reacquired remaining capacity of the secondary battery is lower than a threshold. In this case, the control method may be constituted to include the steps of: connecting an output from one of the plurality of secondary batteries to the loads; and connecting another secondary battery among the plurality of secondary batteries to the loads, if the reacquired remaining capacity of the secondary battery is lower than a threshold.

The secondary battery control device and control method according to the present invention can accurately detect a remaining capacity of a secondary battery while taking advantage of the effect of the power-saving mode. Further, in an electronic device having two or more secondary batteries, switching between the secondary batteries can be appropriately performed during the power-saving mode.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a time chart illustrating the state of the battery during execution of the process of the flowchart shown in FIG. 5.

DESCRIPTION OF THE PREFERRED EMBODIMENTS

Figure 1:
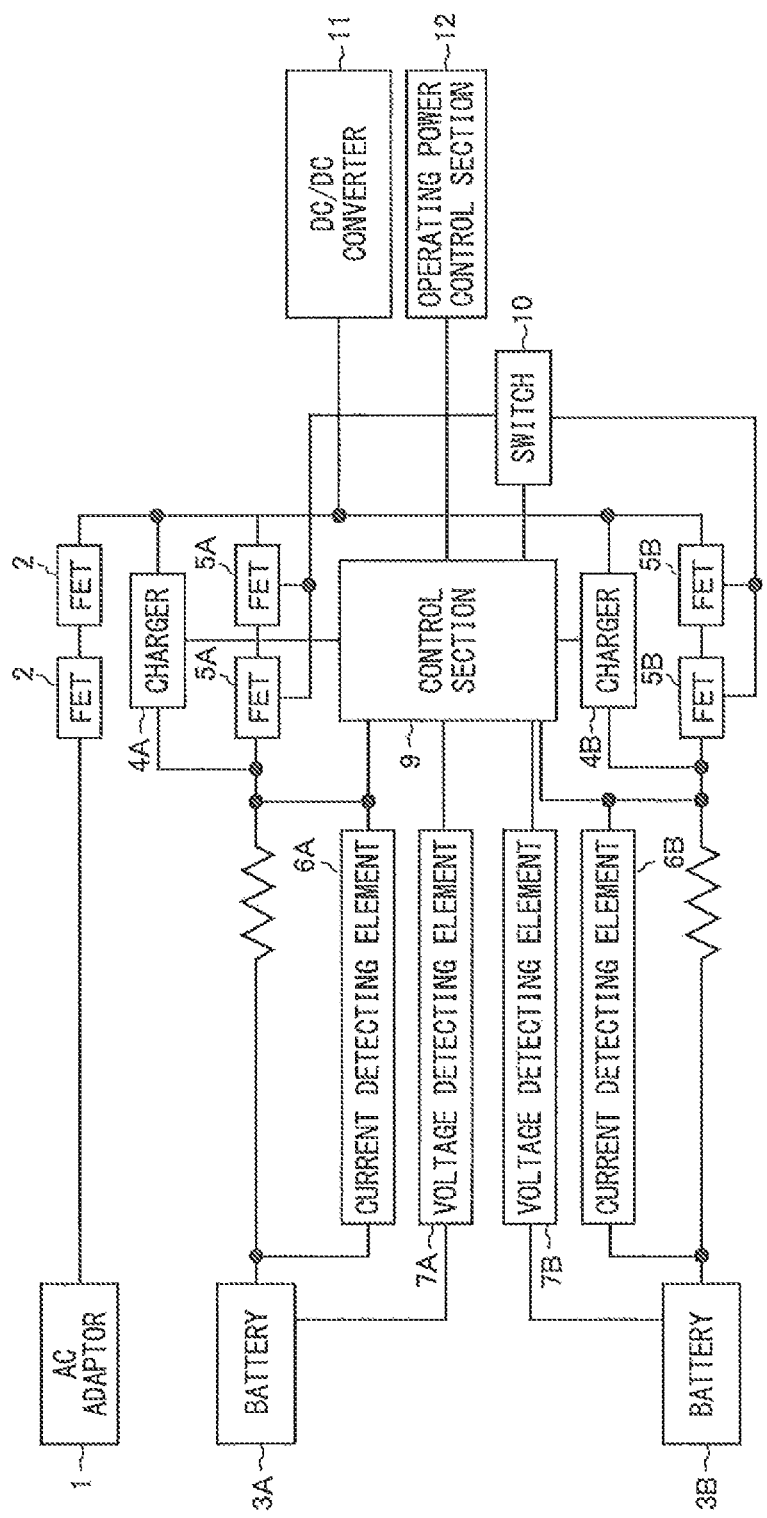
FIG. 1 is a block diagram illustrating an exemplary hardware structure of a battery control device according to Embodiment 1 of the present invention.

Hereinafter, preferred embodiments of the invention will be described. In the following description, the same components are denoted by the same reference numerals, and the same components have the same names and same functions. Therefore, detailed description thereof will be omitted.

Embodiment 1

Hereinafter, a battery control device according to Embodiment 1 of the present invention will be described with reference to FIGS. 1 to 4.

(Structure)

FIG. 1 is a block diagram illustrating an exemplary schematic structure of the battery control device according to Embodiment 1. The battery control device controls two batteries incorporated in a notebook PC as an example of an electronic device. The battery control device of Embodiment 1 uses two batteries, i.e., a battery 3A as a first battery and a battery 3B as a second battery. These batteries have the same rating. However, the application of the present invention is not limited to a notebook PC having two batteries. The present invention is applicable to other electronic devices, such as PDAs (Personal Digital Assistances) and mobile phones, each having two batteries. In any case, the two batteries may have different ratings. The number of batteries may be one or more than two. Each of the batteries may be provided with a microcomputer and/or a sensor so that the battery itself has a current detection function and a voltage detection function (further, a remaining capacity calculation function).

A control section 9 in the notebook PC has two operation modes. In this embodiment, it is assumed that the control section 9 has a normal mode and a sleep mode which consumes less power than the normal mode. In the sleep mode, supply of power to a part of the circuitry in the control section 9 is temporarily stopped to reduce the power consumption by the control section 9. The control section 9 may have other modes than those mentioned above. In the control section 9 which calculates and corrects the remaining battery capacity and controls a switch described later, major functions (functions other than a wake timer function and an interruption function) are stopped during the sleep mode. In the present embodiment, the target to be operated during the sleep mode is the control section 9. However, the present invention is not limited thereto. The target to be operated during the sleep mode may be the electronic device itself such as the notebook PC. In this case, the notebook PC or the like, which is operated during the sleep mode, cannot calculate and correct the remaining battery capacity, and cannot control the switch described later.

The battery control device according to Embodiment 1 is characterized by the control section 9 having the following functions. When the control section 9 changes its operation mode to the sleep mode, the control section 9 calculates, based on the current remaining battery capacity and the discharging current value at such time, the amount of time that will be required for the battery capacity to reach a predetermined remaining battery capacity (for example, about 5%). The control section 9 sets the calculated time in a wake timer as the amount of time that will be required for restoration to the normal mode. When the set time has passed, the control section 9 restores its operation mode to the normal mode, and corrects the remaining battery capacity to obtain an accurate remaining battery capacity.

As shown in FIG. 1, the battery control device includes, in addition to the control section 9, a switch 10 controlled by the control section 9. The switch 10 switches between the battery 3A as the first battery and the battery 3B as the second battery to connect the selected switch to a DC/DC converter 11 which supplies power of a predetermined voltage to the circuit (load) that drives the notebook PC. The battery 3A and the battery 3B are individually detachable from the notebook PC, and have the same rating as described above.

The control section 9 of the battery control device according to the present embodiment controls supply of power to the DC/DC converter 11 (supply of power from the battery 3A, supply of power from the battery 3B, or supply of power from an AC adaptor 1), and controls charging to the battery 3A and the battery 3B. As shown in FIG. 1, the battery control device includes: the AC adaptor 1 for converting an AC voltage, which is obtained from an external commercial power supply, to a DC voltage, and outputting the DC voltage; a charger 4A for charging the battery 3A; a current detection element 6A and a voltage detection element 7A for checking the charging condition and operating state of the battery 3A; a charger 4B for charging the battery 3B; and a current detection element 6B and a voltage detection element 7B for checking the charging condition and operating state of the battery 3B.

Further, in FIG. 1, FETs 2, FETs 5A, and FETs 5B are switches for selectively connecting the AC adaptor 1, the battery 3A, and the battery 3B to the DC/DC converter 11, or connecting the battery 3A to the charger 4A, or connecting the battery 3B to the charger 4B.

The battery control device further includes an operating power control section 12 for controlling switching of the operation modes of the notebook PC (in this embodiment, for example, a shutdown mode, a hibernation mode, a suspend mode, a normal mode, etc.) in accordance with an instruction from the control section 9. In FIG. 1, the operating power control section 12 is illustrated as a component of the battery control device. However, the operating power control section 12 is not an indispensable component of the battery control device. That is, a device that is not included in the battery control device may control switching of the operation modes of the notebook PC. The following will describe how the battery control is performed when the control section 9 changes its operation mode from the normal mode to the sleep mode in the case where the operation mode of the notebook PC is the shutdown mode, or the hibernation mode, or the suspend mode (these modes are collectively referred to as an inactive mode, hereinafter). In the following description, the operation mode of the notebook PC is the inactive mode unless otherwise specified.

The control section 9 includes a microcomputer or a combination of logic circuits. In the microcomputer which includes a CPU section and various kinds of modules, the operation of the CPU section is stopped during the sleep mode, but a module that realizes a wake timer function is operated even during the sleep mode. Specifically, even during the sleep mode, the wake timer continues countdown from a set timer value, and restores the CPU section by a time-up signal. The control section 9 outputs a restoration signal to the operating power control section 12 to restore the operation mode of the notebook PC from the inactive mode to the normal mode. When the system of the notebook PC detects, for example, that the power switch of the notebook PC is pressed, the CPU section is restored by an interruption signal which is inputted to a specific module (a module that is operated even during the sleep mode) in the control section 9. The control section 9 outputs a restoration signal to the operating power control section 12 to restore the operation mode of the notebook PC from the inactive mode to the normal mode. A controller (microcomputer) other than the control section 9 may perform the wake timer process and the interruption process.

The above-described processes are merely examples, and the present invention is not limited to these examples. At least a control unit (the control section 9 in this embodiment) for controlling batteries installed in an electronic device is provided with a wake tinier which is operated even during the sleep mode, or a module that receives during the sleep mode an interruption signal from a system that control the entirety of the electronic device, and the control unit restores its own operation mode from the sleep mode to the normal mode when a request of restoration to the normal mode is detected.

The control section 9 receives the discharging current values and the charging current values of the battery 3A and the battery 3B from the current detection element 6A and the current detection element 6B, respectively, and receives the open-circuit voltage values of the battery 3A and the battery 3B from the voltage detection element 7A and the voltage detection element 7B, respectively. The control section 9 performs time integration of the discharging current value to calculate the discharge amount, and subtracts the discharge amount from the charge amount to calculate the remaining battery capacity. The remaining battery capacity may be represented by, for example, a ratio of the discharge amount to the full charge amount.

In order to increase the accuracy of the remaining battery capacity or the charge rate, the control section 9 measures the open-circuit voltage value of the battery, and corrects the charge rate based on the "open-circuit voltage vs. charge rate" characteristics. The charge rate may be calculated based on the open-circuit voltage value. The open-circuit voltage is an interpolar voltage that is measured when both terminals of a stable battery are open, or an interpolar voltage that is measured in a high impedance state. The charge rate is the percentage of the remaining battery capacity, where the full charge amount of the battery is 100 percent. The "open-circuit voltage vs. charge rate" characteristics are represented by, for example, a correction table or a correction function. In this case, correction table data or correction function coefficients are stored in a nonvolatile memory (not shown) as characteristics data. The control section 9 converts the open-circuit voltage value, which is measured by the voltage detection element 7A or the voltage detection element 7B, to the charge rate by using the characteristics data, and corrects, by using the charge rate, the remaining battery capacity calculated based on the time-integrated discharging current value. When the temperature characteristics of the battery are considered, the control section 9 may perform temperature correction based on the open-circuit voltage value. The remaining capacity calculation method and the remaining capacity correction method are not limited to the above-described methods.

Each of the battery 3A and the battery 3B is, for example, a lithium-ion battery rated at 5700 mAh/7.4V and having four battery cells. However, in the battery control device and the battery control method according to the present invention, the battery type, the output voltage value of the battery, the capacity of the battery, and the like are not particularly limited. The control logic of the control section 9 can be applied to various types of batteries.

If the notebook PC is provided with only one battery (for example, only the battery 3A), the components with suffix B in FIG. 1 (i.e., the battery 3B, the charger 4B, the FETs 5B, the current detection element 6B, and the voltage detection element 7B) and the switch 10 are not required.

Although in this embodiment the battery control device is embedded in the notebook PC, illustration and description of the circuit construction of the notebook PC body are omitted.

(Software Configuration)

Figure 2:
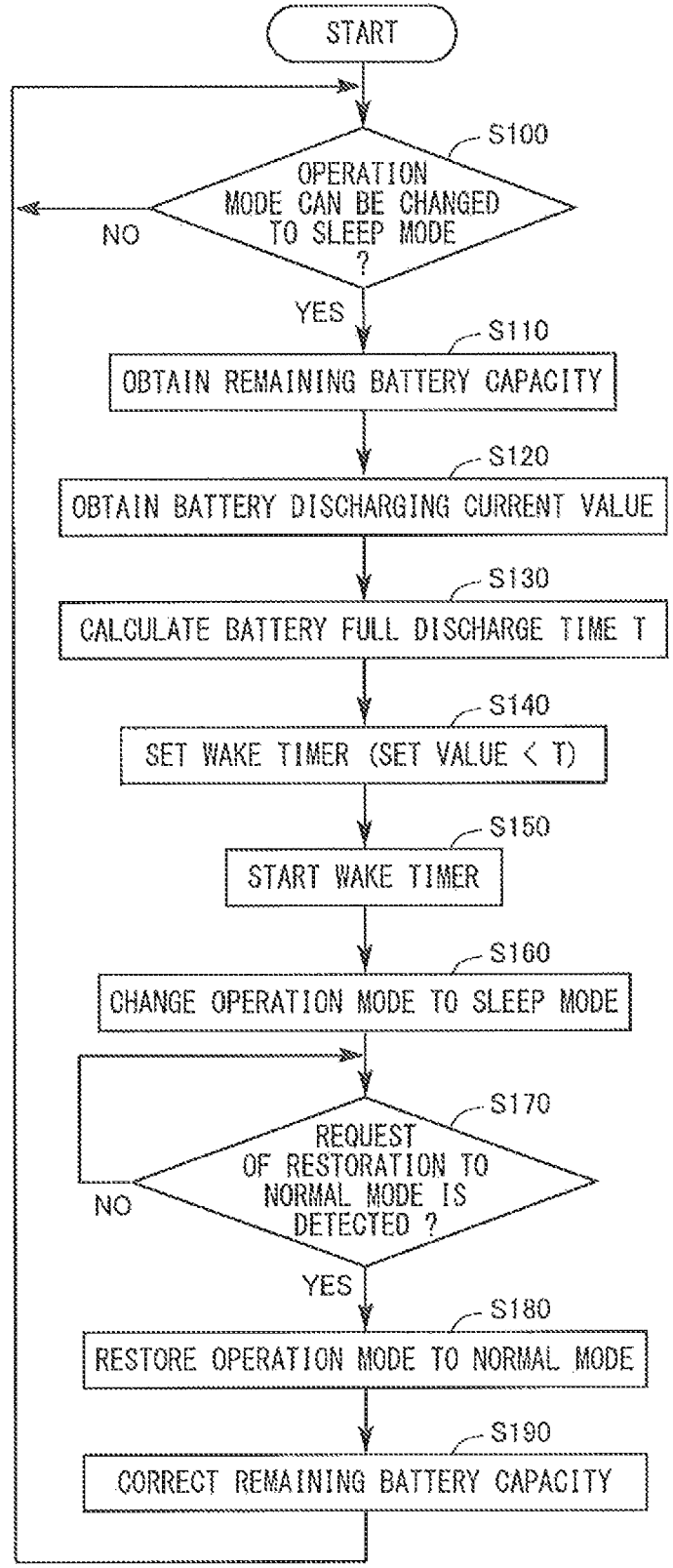
FIG. 2 is a flowchart illustrating a procedure of a remaining battery capacity detecting process which is executed by a control section shown in FIG. 1.

With reference to FIG. 2, a control flow of a remaining battery capacity detecting process, which is executed by the control section 9 shown in FIG. 1, will be described.

In step 100 ("step" is abbreviated as "S", hereinafter), the control section 9 determines whether the control section 9 can change its operation mode to the sleep mode. The control section 9 determines that it can change its operation mode to the sleep mode if the following conditions are satisfied: (a) there is no startup request (no request of restoration from the sleep mode) from a system (OS: operating system) that is executed by the CPU of the notebook PC; (b) there is no startup request via a wireless LAN; (c) the batteries 3A and 3B are in their normal states; and (d) a rear cover of the notebook PC in which the batteries are housed is not open (or a battery lock mechanism is not in a released state). Particularly, if the notebook PC is not configured so as to receive a startup request via wireless LAN (Wake On LAN configuration) when the operation mode of the notebook PC is the inactive mode, the control section 9 determines that the control section 9 can change its operation mode to the sleep mode. When the control section 9 determines that it can change its operation mode to the sleep mode (YES in S100), the process goes to S110. Otherwise (NO in S100), the process returns to S100.

In S110, the control section 9 obtains the remaining capacity of the battery connected to the DC/DC converter 11. The remaining capacity obtained at this time may be: the remaining capacity that is obtained by, during the normal mode, subtracting, from the remaining capacity, the discharge amount calculated by time-integrating the discharging current value; or the remaining capacity that is corrected using the measured open-circuit voltage value. In S120, the control section 9 obtains the battery discharging current value. The discharging current value is a minute current value discharged from the battery when the operation mode of the control section 9 is the sleep mode. If the discharging current value immediately before the sleep mode is the minute current value, the control section 9 obtains, in S120, as the battery discharging current value, the current value detected by the current detection element 6A or the current detection element 6B.

In S130, the control section 9 calculates, based on the obtained remaining battery capacity and the discharge amount calculated by time-integrating the battery discharging current value (minute current value), the amount of time T (full discharge time T) that will be required for the remaining battery capacity to become 0 (zero) when the sleep mode continues. In S140, the control section 9 sets the wake timer. At this time, the control section 9 sets the wake timer at a timer set value that is shorter than the full discharge time T. The timer set value is the amount of time that will be required for the battery charge rate to mach X % (for example, X %=10%, 5%, or 1%). The process of S130 and the process of S140 may be integrated. That is, the wake timer may be set with, as a timer set value, the time at which the remaining battery capacity (charge rate) reaches X %, based on the remaining battery capacity obtained by the control section 9 and the discharge amount calculated by time-integrating the battery discharging current value (minute current value). In any case, the X % is appropriately selected in accordance with the time required for the process (for example, shutdown) that is performed in the notebook PC when the remaining battery capacity decreases.

In S150, the control section 9 starts the wake timer. In S160, the control section 9 changes its own operation mode to the sleep mode.

In S170, the control section 9 determines whether a request of restoration to the normal mode is detected. For example, the control section 9 determines that the request of restoration to the normal mode is detected when it is informed, by an interruption signal from the system of the notebook PC, that (a) a time-up signal of the wake timer is received; (b) the power switch of the notebook PC is pressed; (c) the AC voltage is supplied; (d) the rear cover of the notebook PC in which the batteries are housed is open (or the battery lock mechanism is in a released state); or (e) the closed display panel of the notebook PC is open. When it is determined that the request of restoration to the normal mode is detected (YES in S170), the process goes to S180. Otherwise (NO in S170), the process returns to S170 to keep the sleep mode.

In S180, the control section 9 restores its own operation mode to the normal mode. At this time, the operation mode of the notebook PC is not always restored from the inactive mode to the normal mode. In the case where the operation mode of the notebook PC is restored to the normal mode, the control section 9 outputs, based on the request of restoration to the normal mode, an instruction (an instruction of restoration from the inactive mode) to the operating power control section 12, which, in turn, restores the operation mode of the notebook PC from the inactive mode to the normal mode.

In S190, the control section 9 corrects the remaining battery capacity. At this time, the control section 9 calculates the remaining battery capacity by subtracting, from the remaining battery capacity obtained in S110, the battery discharge amount calculated based on the battery discharging current value (minute current value) and the sleep time. The calculated remaining battery capacity may be corrected by using the open-circuit voltage value. Alternatively, the remaining battery capacity may be calculated (not corrected) by using the open-circuit voltage value. Since the remaining battery capacity is recalculated in this way, the remaining battery capacity that was stored when the operation mode was changed to the sleep mode is corrected to an accurate value. Thereafter, the process returns to S100.

(Operation)

The operation of the battery control device according to Embodiment 1, based on the above-described structure and flowchart, will be described hereinafter.

First, the operation of the battery control device in the case where battery replacement is not performed during the sleep mode will be described. It is assumed that the request of restoration to the normal mode is triggered by time-up of the wake timer, and the battery 3A supplies power to the DC/DC converter 11.

Figure 3:
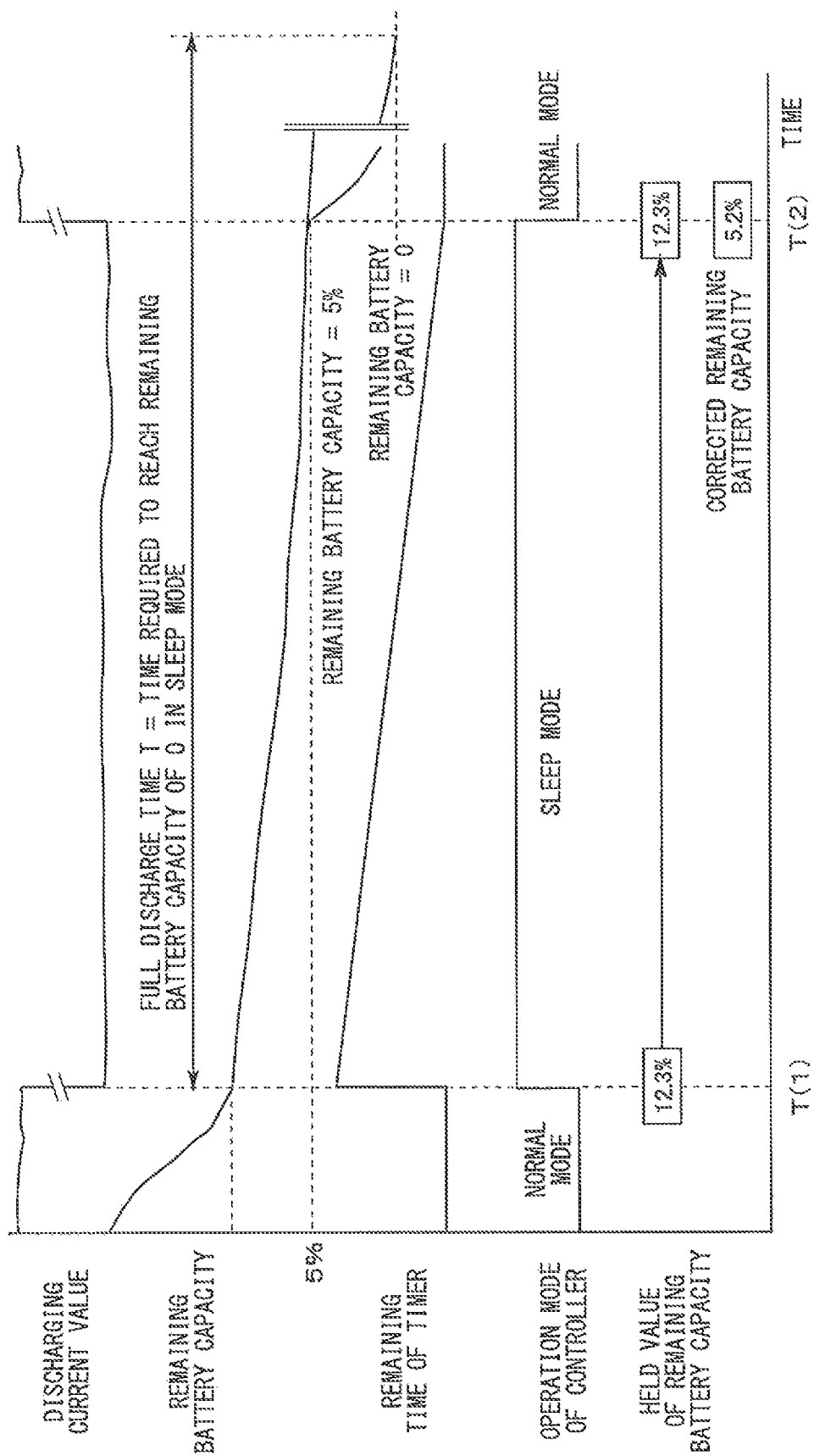
FIG. 3 is a time chart illustrating the state of a battery during execution of the process of the flowchart shown in FIG. 2.

FIG. 3 is a time chart illustrating the state of the battery 3A. At time T(1), the control section 9 is allowed to change its operation mode from the normal mode to the sleep mode (YES in S100). Thereafter, the remaining capacity of the battery 3A is obtained (S110), the full discharge time T that will be required for the battery 3A to become fully discharged is calculated (S130), and the amount of time (<full discharge time T) that will be required for the remaining battery capacity (charge rate) to become 5% is set in the wake timer as a timer set value (S140). Thereafter, the wake timer is started (S150), and the operation mode of the control section 9 is changed from the normal mode to the sleep mode (S160).

The remaining time of the wake timer which has started at time T(1) decreases with the passage of time. At this time, the operation mode of the control section 9 is the sleep mode. The discharging current value (minute current value) from the battery 3A is less than that in the normal mode, and the remaining capacity of the battery 3A is gently decreased. In the sleep mode, the remaining capacity of the battery 3A is not recalculated. Therefore, 12.3%, which is the remaining capacity obtained when the operation mode was changed to the sleep mode, is stored in the memory.

When the time set in the wake timer is up at time T(2) (YES in S170), the operation mode of the control section 9 is restored from the sleep mode to the normal mode (S180). At this time, the remaining battery capacity is calculated by subtracting, from the stored remaining battery capacity, the battery discharge amount which is calculated based on the battery discharging current value (minute current value) and the sleep time. Then, the calculated remaining battery capacity is corrected by using the open-circuit voltage value, and thus the remaining battery capacity is recalculated. As a result of the recalculation, the remaining capacity of the battery 3A is 5.2%.

In this way, the amount of time that is required to reach the arbitrary remaining battery capacity (the charge rate of X %), which time is shorter than the time (full discharge time) required for the battery to become fully discharged, is set in the wake timer when the operation mode is changed to the sleep mode. When the time at which the remaining battery capacity is 5% is reached, the time set in the wake timer is up. Thereby, the control section 9 is restored to the normal mode, and recalculates the remaining battery capacity. Therefore, the remaining battery capacity is recalculated just one time in the normal mode at an arbitrary time before the full discharge of the battery. As a result, the remaining battery capacity can be accurately detected while taking advantage of the effect of the power-saving mode.

Next, the operation of the battery control device in the case where battery replacement is performed during the sleep mode will be described. It is assumed that the control section 9 changes its operation mode to the sleep mode while the battery 3A supplies power to the DC/DC converter 11, and the battery 3A is, during the sleep mode, replaced with a battery that is separately charged. It should be noted that the request of restoration to the normal mode does not include the factors relating to the battery change, i.e., opening of the rear cover of the notebook PC in which the battery is housed, and releasing of the battery lock mechanism.

Figure 4:
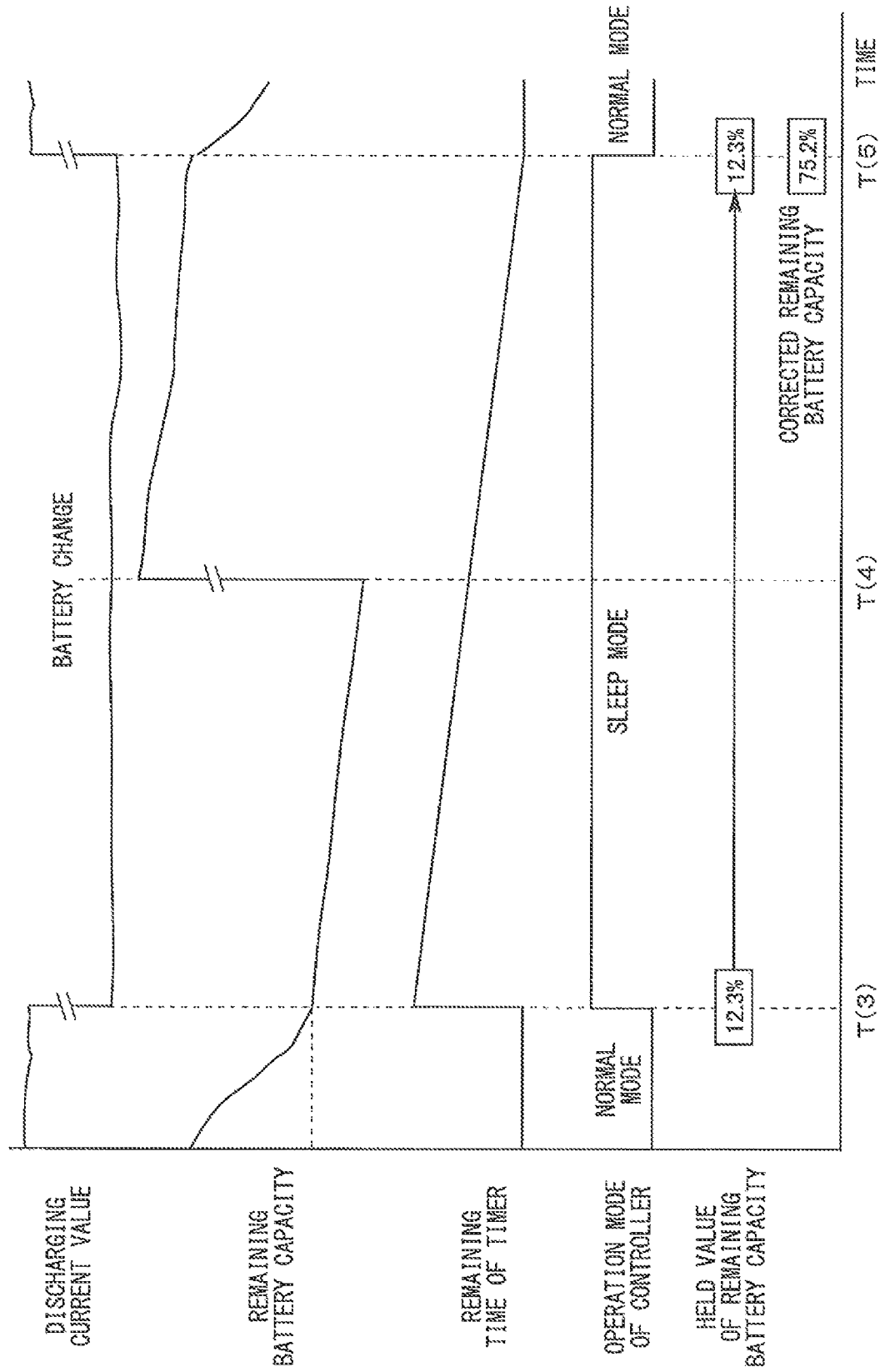
FIG. 4 is a time chart illustrating the state of the battery when the battery is replaced with another battery during execution of the process of the flowchart shown in FIG. 2.

FIG. 4 is a time chart illustrating the state of the battery 3A. In the following description, the description of the same operation as the operation already described with reference to FIG. 3 is not repeated.

At time T(3), the operation mode of the control section 9 is changed from the normal mode to the sleep mode. At time T(5), the time set in the wake timer is up. At time T(4) between time T(3) and time T(5), the battery 3A is replaced with another battery which is charged up to about 75%. Since the control section 9 remains in the sleep mode, the remaining battery capacity is still 12.3% at time T(5). At this time, there is a great gap between the actual remaining battery capacity (about 75%) and the remaining battery capacity (12.3%) stored in the memory.

At time T(5), the time set in the wake tinier is up (YES in S170), and the operation mode of the control section 9 is restored from the sleep mode to the normal mode (S180). At this time, the remaining battery capacity is recalculated using the open-circuit voltage value. As a result of the recalculation, the remaining capacity of the battery 3A becomes 73.3%.

In the case where the battery is replaced during the sleep mode, when the amount of time from when the operation mode is changed to the sleep mode to when the remaining capacity of the battery-to-be-removed becomes 5%, has passed, the remaining battery capacity is recalculated. That is, even in the case where the battery is replaced during the sleep mode, the remaining capacity of the battery-to-be-connected (replacement battery) can be accurately calculated based on, as the upper limit, the amount of time that is required for the remaining capacity of the battery-to-be-removed to decrease to 5%. Since the control section 9 remains in the sleep mode until the remaining capacity of the battery-to-be-removed becomes 5%, the actual remaining battery capacity is unknown even after the battery is replaced. However, the remaining capacity of the replacement battery is calculated when the remaining battery capacity of the battery-to-be-removed decreases to 5%. Therefore, an accurate remaining battery capacity can be obtained when the amount of time that is required for the remaining battery capacity to decrease to 5%, has passed.

On the condition that the switch 10 is operated even during the sleep mode, an accurate remaining battery capacity can be obtained as described above even when the battery 3A is removed to be replaced with the battery 3B during the sleep mode.

As described above, according to the battery control device of the present embodiment, when the control section 9 changes its operation mode to the sleep mode, the amount of time that is required for the remaining battery capacity to reach a predetermined capacity (the charge rate X %: X %=10%, 5%, or 1%) is calculated by using the remaining battery capacity and the discharging current value, and the calculated amount of time is set in the wake timer as the amount of time that is required for the control section 9 to be restored to the normal mode. When the set time has passed, the control section 9 is restored to the normal mode, and corrects the remaining battery capacity to obtain an accurate remaining battery capacity. Therefore, the remaining battery capacity can be accurately detected while taking advantage of the effect of the power-saving mode. Particularly, even when the battery is replaced or removed, an accurate remaining battery capacity can be obtained quickly. In the conventional art, the sleep mode time cannot be known if the battery is fully discharged. Therefore, even if a fully-charged battery is prepared, the electronic device cannot enter the sleep mode. The battery control device of the present embodiment can avoid such a problem in the conventional art.

Embodiment 2

Figure 5:
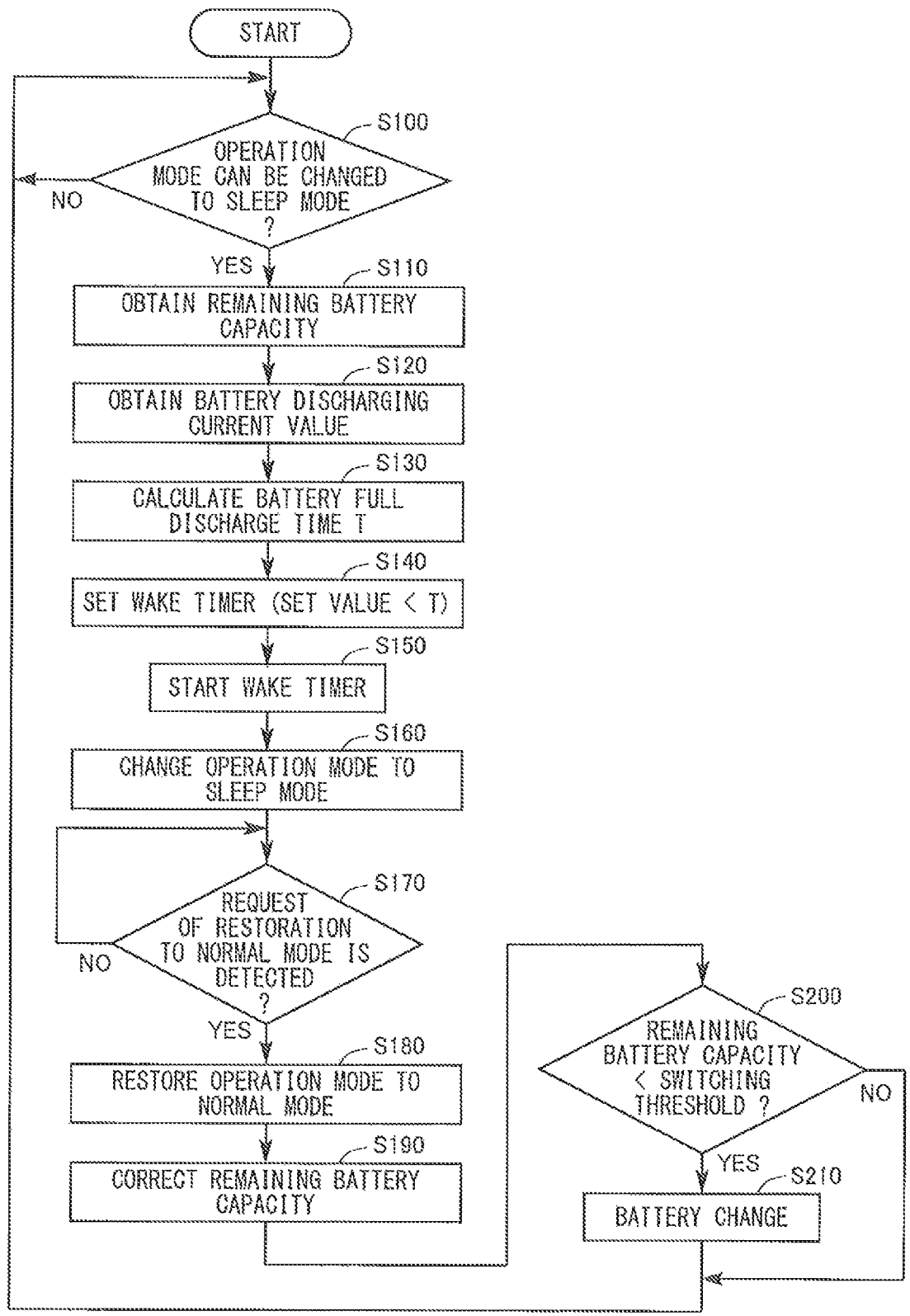
FIG. 5 is a flowchart illustrating a battery switching process executed by a control section of a battery control device according to Embodiment 2 of the present invention.

Hereinafter, a battery control device according to Embodiment 2 of the present invention will be described with reference to FIGS. 5 and 6. In the following description, the description of the same components as those of Embodiment 1 is not repeated. It should be noted that the battery control device according to Embodiment 2 controls two or more batteries.

The hardware structure of the battery control device according to Embodiment 2 is identical to that shown in FIG. 1. In this embodiment, the control section 9 executes a battery switching process, in addition to the remaining battery capacity detecting process described for Embodiment 1. The control flow of the battery switching process will be described with reference to FIG. 5. The processes at S100 to S190 in FIG. 5 are identical to those in FIG. 2.

In S200, the control section 9 determines whether the remaining battery capacity is lower than a switching threshold. When it is determined that the remaining battery capacity is lower than the switching threshold (YES in S200), the process goes to S210. Otherwise (NO in S200), the process returns to S100. In S210, the control section 9 changes the battery that supplies power to the DC/DC converter 11. Thereafter, the process returns to S100.

Next, the operation of the battery control device according to Embodiment 2, based on the above-described structure and flowchart, will be described. The description of the same operation as that of Embodiment 1 is not repeated.

FIG. 6 is a time chart illustrating the battery state. The operation mode of the control section 9 is changed from the normal mode to the sleep mode at time T(6), and restored from the sleep mode to the normal mode at time T(7) when the time set in the wake timer is up. At this time, the remaining battery capacity is recalculated. The remaining capacity of the battery 3A is 4.2%.

Assuming that the threshold for switching the battery is 4.5%, since the remaining battery capacity (4.2%) is less than (<) the switching threshold (4.5%) (YES in S200), the battery 3A is switched to the battery 3B, and thus power is supplied from the battery 3B to the DC/DC converter 11 (S210).

According to the battery control device of Embodiment 2, in the two-battery system, the control section 9 is restored to the normal mode at an arbitrary time before the battery being used is fully discharged, and changes, by using the switch, the battery that supplies power. As described above, the battery control device of the present embodiment is applicable to an electronic device having two or more batteries.

According to the secondary battery control device and control method of the present invention, various kinds of electronic devices, for example, mobile devices, can be used while avoiding full discharge of a secondary battery used as a power supply in electronic devices. Therefore, the secondary battery control device and control method have a wide range of application.

While the invention has been described in detail, the foregoing description is in all aspects illustrative and not restrictive. It will be understood that numerous other modifications and variations can be devised without departing from the scope of the invention.

What is claimed is:

1. An electronic device having a shutdown mode, the electronic device being driven by power supplied from a secondary battery, comprising:
a control device configured to be changeable between a normal mode while the electronic device is in the shutdown mode, and a sleep mode while the electronic device is in the shutdown mode, the normal and sleep modes both being control-device modes, with the sleep mode being a mode in which a discharging current value from the secondary battery is smaller than that of the normal mode; and
a CPU section of the control device, the CPU section being stopped during the sleep mode and restored when the control device changes from the sleep mode to the normal mode; wherein the control section comprises:
an acquisition section configured to acquire a remaining capacity of the secondary battery during the normal mode immediately before the sleep mode;
a calculation section configured to calculate, as a restoration time from the sleep mode, a time which is shorter than a full discharge time that is required for the secondary battery to be fully discharged, by using the remaining capacity of the secondary battery acquired during the normal mode immediately before the sleep mode, and using a discharging current value from the secondary battery during the normal mode;
a setting section configured to calculate the restoration time in a wake timer which functions even during the sleep mode; and
an instruction section which causes the wake timer to start when changing from the normal mode to the sleep mode, performs a restoration from the sleep mode to the normal mode when the restoration time set in the wake timer is up, and instructs the acquisition section to reacquire the remaining capacity of the secondary battery.

2. The electronic device according to claim 1, wherein the calculation section calculates the restoration time which is shorter than the full discharge time so that the remaining capacity of the secondary battery becomes a predetermined remaining capacity at the time of the restoration from the sleep mode.

3. The electronic device according to claim 2, wherein the predetermined remaining capacity is a remaining capacity that enables a predetermined process after the restoration.

4. The electronic device according to claim 1, wherein
the secondary battery includes a plurality of secondary batteries which are switchable so as to supply power to loads,
the control device further includes a switch for connecting an output from one of the plurality of secondary batteries to the loads, and
the control device further includes a switch control section configured to control the switch so as to connect another secondary battery among the plurality of secondary batteries to the loads, if the reacquired remaining capacity of the secondary battery is lower than a threshold.

5. The electronic device according to claim 4, wherein the calculation section calculates the restoration time which is shorter than the full discharge time so that the remaining capacity of the secondary battery becomes a predetermined remaining capacity at the time of the restoration from the sleep mode.

6. The electronic device according to claim 5, wherein the predetermined remaining capacity is a remaining capacity that enables a predetermined process after the restoration.

7. The electronic device according to claim 1 further comprising an interruption processing section which instructs the acquisition section to return from the sleep mode to the normal mode if an interruption occurs even before the restoration time set in the wake timer is up, and reacquire the remaining capacity of the secondary battery.

8. The electronic device according to claim 1, wherein the electronic device is one of a mobile PC, a PDA, and a mobile phone.

9. The electronic device according to claim 1, wherein the calculation section uses, as the discharging current value used for the calculation of the restoration time, a discharging current value from the secondary battery during the normal mode immediately before the sleep mode.

10. A control method for a control device used for an electronic device having a shutdown mode, the electronic device being driven by power supplied from a secondary battery, wherein the control device is changeable between a normal mode while the electronic device is in the shutdown mode, and a sleep mode while the electronic device is in the shutdown mode, the normal and sleep modes both being control-device modes, with the sleep mode being a mode in which a discharging current value from the secondary battery is smaller than that of the normal mode, and a CPU section of the control device is stopped during the sleep mode and the CPU section is restored when the control device changes from the sleep mode to the normal mode; wherein the control method comprises the steps of:

acquiring a remaining capacity of the secondary battery during the normal mode immediately before the sleep mode;

calculating, as a restoration time from the sleep mode, a time which is shorter than a full discharge time that is required for the secondary battery to be fully discharged, by using the remaining capacity of the secondary battery acquired during the normal mode immediately before the sleep mode, and using a discharging current value from the secondary battery during the normal mode;

setting the restoration time in a wake timer which functions even during the sleep mode; and causing the wake timer to start when changing from the normal mode to the sleep mode, performing a restoration from the sleep mode to the normal mode when the restoration time set in the wake timer is up, and reacquiring the remaining capacity of the secondary battery.

11. The control method according to claim 10, wherein
the secondary battery includes a plurality of secondary batteries which are switchable so as to supply power to loads, and the control method further includes the steps of:

connecting an output from one of the plurality of secondary batteries to the loads, and connecting another secondary battery among the plurality of secondary batteries to the loads, if the reacquired remaining capacity of the secondary battery is lower than a threshold.

12. The control method according to claim 10, wherein the step of calculating the restoration time from the sleep mode uses, as the discharging current value used for the calculation of the restoration time, a discharging current value from the secondary battery during the normal mode immediately before the sleep mode.

\* \* \* \* \*